Aug. 16, 1960 P. H. TAYLOR 2,949,315
COMPRESSIBLE LIQUID VEHICLE SUSPENSION AND POWER SYSTEM
Filed May 16, 1957 6 Sheets-Sheet 5

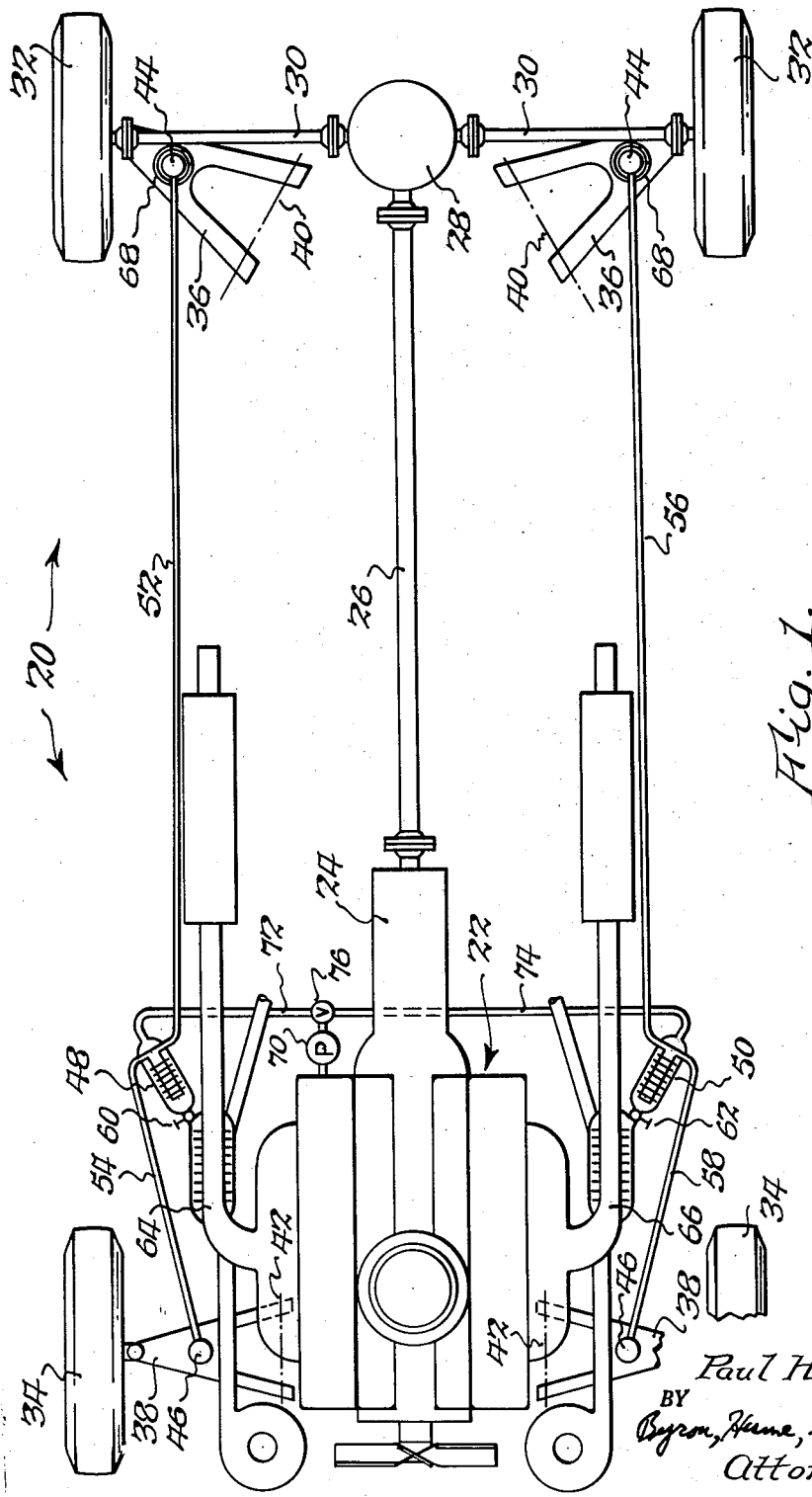

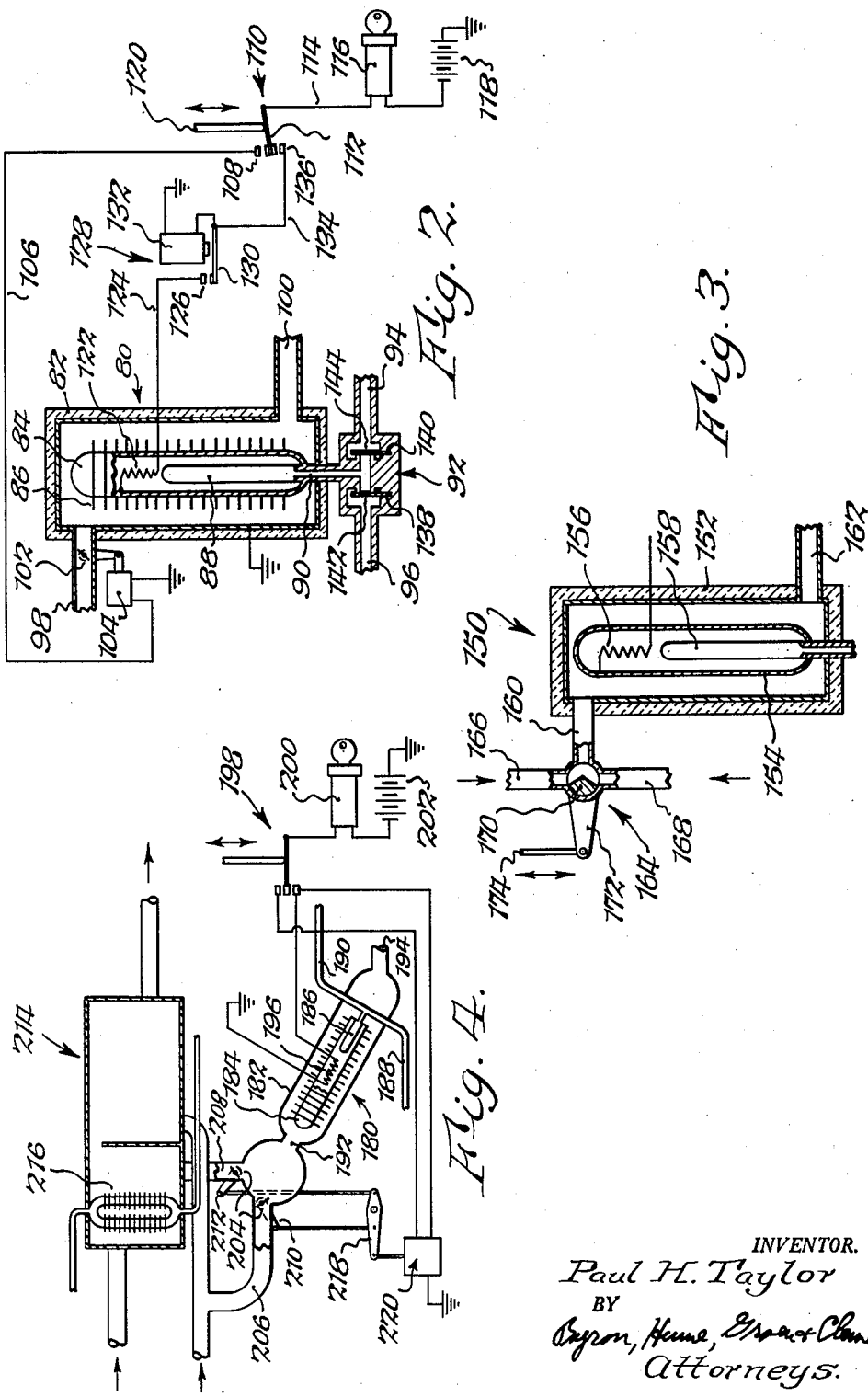

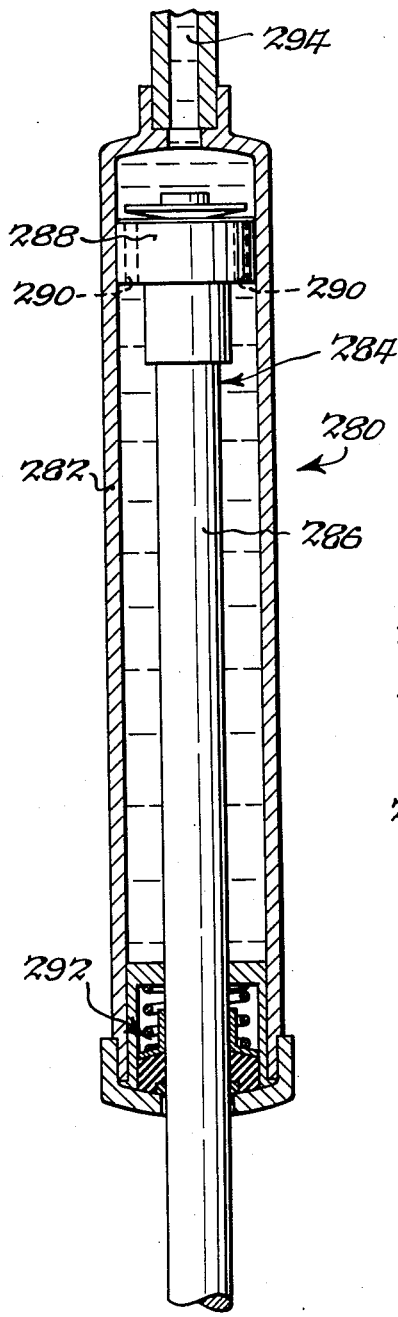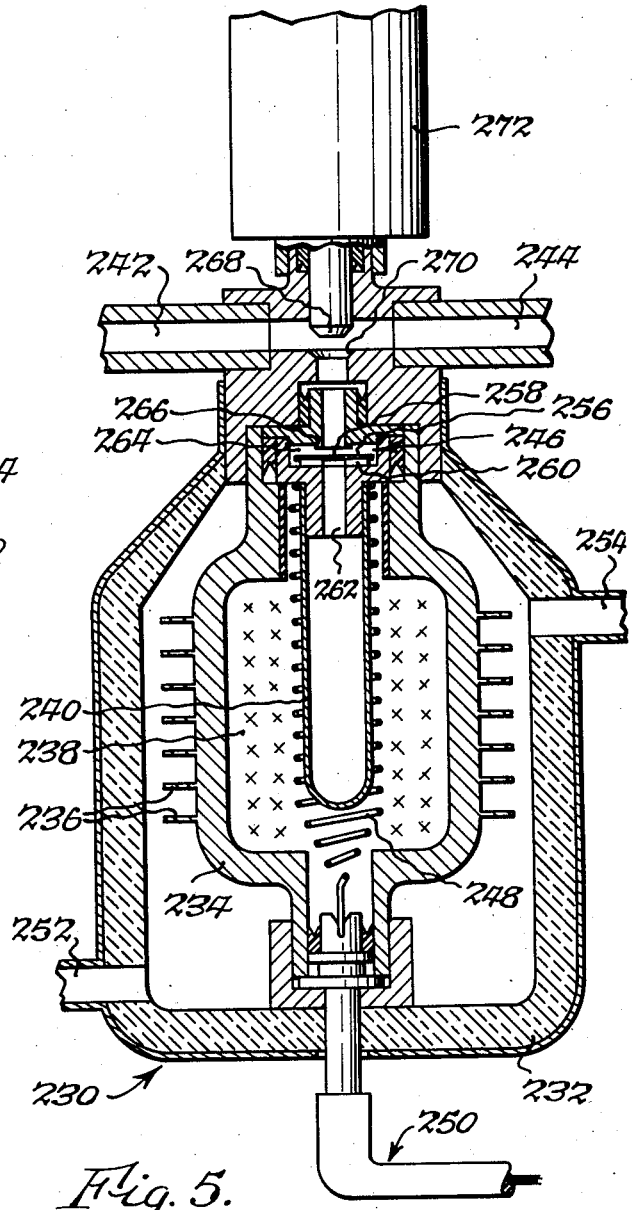

INVENTOR.
Paul H. Taylor
BY
Byron, Hume, Groen & Clement
Attorneys.

United States Patent Office

2,949,315
Patented Aug. 16, 1960

2,949,315

COMPRESSIBLE LIQUID VEHICLE SUSPENSION AND POWER SYSTEM

Paul H. Taylor, North Tonawanda, N.Y., assignor to Tayco Developments, Inc., North Tonawanda, N.Y., a corporation of New York Filed May 16, 1957, Ser. No. 659,629

25 Claims. (Cl. 280—124)

This invention relates to vehicle suspension systems utilizing energy storage and dissipation means. More particularly, the invention relates to a liquid spring vehicle suspension system which is adapted to resiliently support and control the ride of the vehicle and to accomplish vehicle leveling.

In vehicles of all types the modern trend has been to provide means for raising and lowering the vehicle so as to maintain at some predetermined position or vehicle level, a soft, long stroke, cushioned ride, whatever the loading of the vehicle may be. The aim is to maintain the predetermined level while still providing long stroke cushioning to reduce impact loading on the passengers, vehicle structure and cargo. Long stroke cushioning is particularly desirable in connection with the human body, the natural frequency of which has been roughly placed at between sixty and ninety strokes per minute. If at all possible this frequency range should not be exceeded.

Present vehicles, particularly of the heavier type, are usually suspended on mechanical springs, which, in order to accommodate overload and impact stresses, are of the heavy, leaf variety providing a short, stiff bottoming ride when fully loaded. In some heavy trucks, for example, less than ¼ inch of travel is provided with the vehicles fully loaded. The resulting impact, from bumps and the like in the road, is extremely detrimental to the vehicle, the operator, the cargo and the roads.

Because of the poor riding qualities of heavy trucks and large off-the-road vehicles there is a high incidence of kidney ailments among operators, resulting in fatigue induced accidents and shortening of the working life of the operators. The damage to cargo in transit directly attributable to such poor riding qualities is impossible to accurately calculate but obviously runs into many millions of dollars annually. As a result of the extremely detrimental effect of high impact loading on roads, many States have placed limits on cargo weights, thus seriously hampering the motor cargo industry and necessitating unusually high truck freight rates due to excessive costs. Furthermore, since heavy vehicles require extremely stiff springs to accommodate the fully loaded condition, the empty ride of such vehicles many times offers more punishment to the driver than the full ride. Present suspensions ordinarily have an excessive unsprung mass to accommodate heavy impact loading and this presents another difficulty in that it seriously affects the cargo carrying capacity of the vehicle.

The problem of vehicle leveling is becoming increasingly important. If the riding level of the vehicle can be maintained constant whatever the loading condition may be, then the problem of providing a long stroke, properly cushioned ride under all conditions is very much simplified. Furthermore, the maintenance of a substantially constant vehicle level makes for easier and safer driving and adds greatly to the comfort of the operator and passengers.

In short, then, it is highly desirable to provide a vehicle suspension system which will achieve a long stroke, properly cushioned ride under all loads and will accomplish vehicle leveling for all load conditions. At the same time it is desirable to provide lighter vehicle supporting structures which in turn will reduce unsprung impact forces and will permit larger pay loads.

It is accordingly an important object of the present invention to provide an improved vehicle suspension system.

Another object of the invention is to provide a vehicle suspension system which will provide a long stroke cushioned vehicle ride under all load conditions.

A further object of the invention is to provide a vehicle suspension system accommodating improved means for accomplishing vehicle leveling under all loading conditions.

A still further object of the invention is to provide a vehicle suspension system capable of achieving a cushioned ride under all loading conditions and incorporating means for accomplishing vehicle leveling under all conditions.

An important object of the invention is to provide a vehicle suspension system incorporating vehicle leveling means utilizing waste thermal energy of the vehicle engine.

Another object of the invention is to provide a vehicle suspension system capable of accomplishing vehicle leveling without the necessity of incorporating hydraulic pumps or the like.

A further object of the invention is to provide a vehicle suspension system incorporating vehicle leveling means capable of utilizing outside heat sources in the event of low ambient temperatures.

An additional object of the invention is to provide a vehicle suspension system embodying improved dampening means.

Another object of the invention is to provide an improved auxiliary suspension system for supplementing existing mechanical systems.

Other objects, features and advantages will be apparent from the following detailed description taken in conjunction with the accompanying drawings, in which:

Figure 1 is a schematic plan view of a vehicle suspension system according to the present invention;

Figure 2 is a schematic sectional view of the accumulator and control portion of a suspension system such as shown in Figure 1;

Figure 3 is a schematic sectional view of another embodiment of an accumulator and control arrangement;

Figure 4 is a schematic sectional view of a third embodiment of an accumulator and control arrangement;

Figure 5 is an enlarged sectional view of a preferred accumulator and related elements for incorporation in the system of Figure 1;

Figure 6 is an enlarged sectional view of a wheel strut or cylinder for use in the suspension system of Figure 1;

Figure 7:
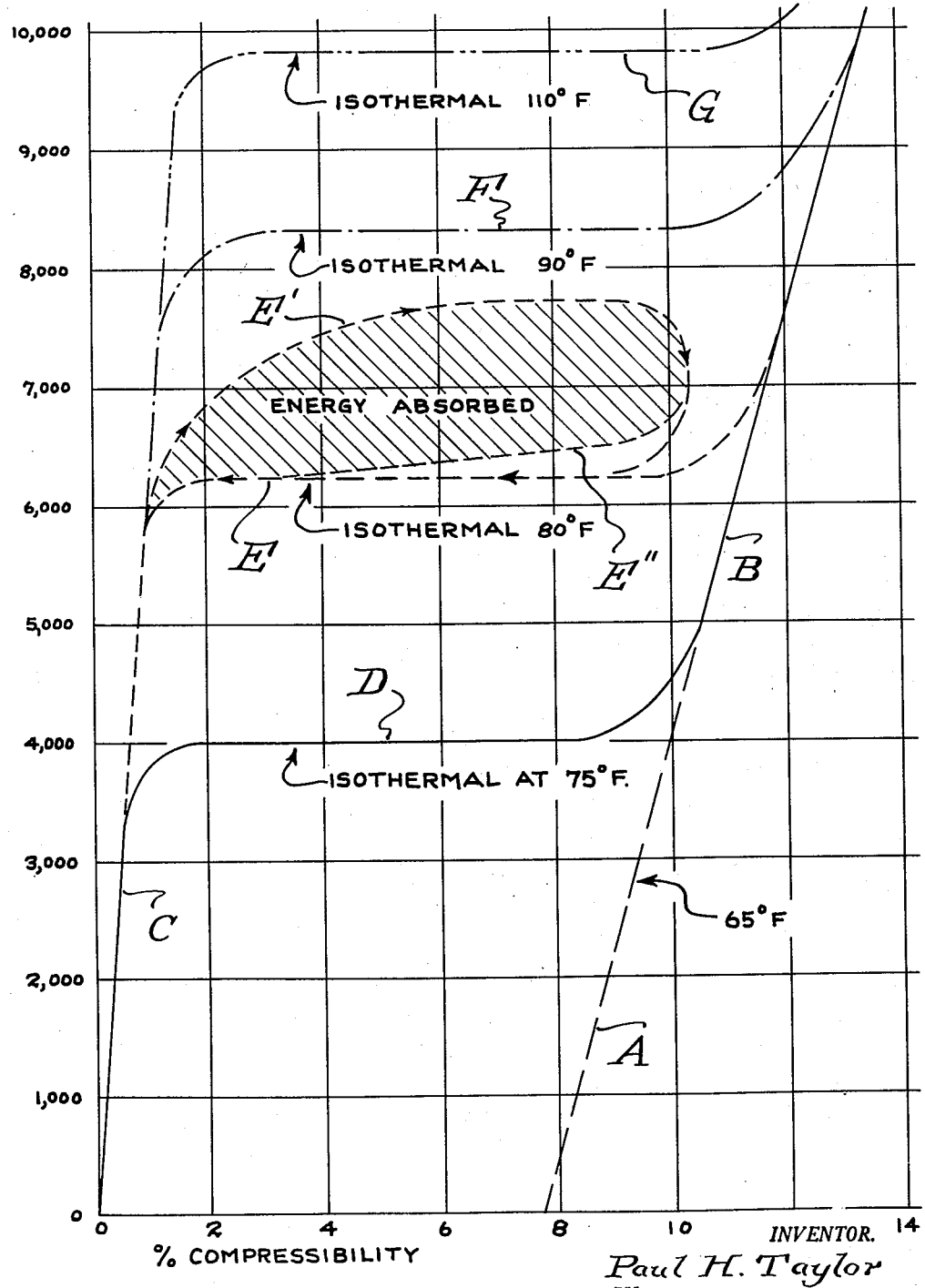
Figure 7 is a graphic representation of the operation of a typical vehicle suspension system according to the present invention.

In Figure 1 is illustrated a vehicle suspension system generally designated by the reference numeral 20 for supporting a vehicle superstructure (not shown) incorporating an internal combustion engine 22, a power transmission 24, a drive shaft 26, a differential 28, rear wheel drive axles 30, 30, rear driving wheels 32, 32, and front steerable wheels 34, 34. The vehicle wheels 32 and 34 are rotatably connected in any suitable manner to respective pairs of A frame members 36 and 38, and the A frame members are pivotally connected to the vehicle frame (not shown) in any suitable manner for pivoting on axes 40 and 42, respectively. The weight of the vehicle is transferred to the A frame members 36 and 38 through rear wheel cylinders or struts 44, 44 and front wheel cylinders or struts 46, 46. The wheel cylinders are of the liquid spring type and will be discussed in detail later.

The cylinders 44 and 46 on one side are hydraulically connected to an accumulator 48, and on the other side to an accumulator 50, through respective hydraulic conduits or pipes 52, 54, 56 and 58. The accumulators will be described in detail later, but for the present purpose it suffices to note that they are intended to be filled with a compressible liquid preferably capable of undergoing reversible polymorphic transition, or change of non-gaseous form resulting in a change of volume at substantially constant pressure, at temperatures and pressures within the ranges to be encountered in operation of the vehicle suspension system of this invention. For example, compressible liquids of the dimethyl siloxane family may be conveniently utilized.

The wheel cylinders 44 and 46 and the lines 52, 54, 56, and 58 are intended to be completely filled with a compressible liquid which will not undergo polymorphic transition in the temperature and pressure ranges to be encountered. For example, non-polymorphic dimethyl siloxanes, conventional hydraulic fluids, or the like can be utilized for this purpose. As will be described, the accumulators are constructed so that the two liquids will not mix, although pressure is freely transmitted between the liquids.

It should be understood that since the wheel units, the accumulators and the lines are completely filled with liquids, the spring effect is achieved mainly through actual compression of the liquids themselves, but elastic deflection of the walls of the various vessels and tubes is utilized to some extent.

For supplying heat to the accumulators 48 and 50 to change the volume or the pressure level of polymorphic transition of the liquids therein, the accumulators are connected through respective control valves 60 and 62 to the opposite sides 64 and 66 of the engine exhaust system. The valves 60 and 62 may be controlled in any suitable manner such as by connecting the valves to vehicle level sensing means to be described in detail later.

To provide an initial reference position for maintaining the same vehicle height at the front and rear, coil centering springs 68, 68 surround the rear wheel cylinders 44 and are resiliently disposed between the A frames 36 and the vehicle frame (not shown). The coil springs 68 do not provide primary support for the vehicle but correct the tendency of the vehicle to nose up or down due to uneven fore and aft loads, such as encountered during acceleration or deceleration. For example, if the vehicle is braked so that it tends to nose down, the springs 68 prevent or hinder the draining of the front wheel cylinders and the overfilling of the rear wheel cylinders since the coil springs resiliently urge the frame toward a static fore and aft level. If desired, torsion bars could be used at pivot points 40 to stiffen the spring rate on the rear suspensions.

For replenishing the hydraulic fluid in the lines and in the wheel cylinders and for providing an emergency source of hydraulic power an auxiliary pump 70 may be incorporated. The pump 70 may be of any suitable type and is driven by the vehicle engine 22 for feeding hydraulic fluid under pressure from a suitable sump (not shown) into auxiliary lines 72 and 74 which are connected, respectively, to the lines 52 and 56. A valve 76 of any suitable construction is provided at the juncture between the pump outlet and the lines 72 and 74. The valve is normally closed to prevent communication between the lines 72 and 74, but when the pump 70 is to be operated the valve is opened.

To provide additional resiliency in the suspension system the lines 52, 54, 56 and 58 may be formed of a resilient material such as nylon or beryllium copper.

In the system schematically illustrated in Figure 1 approximately 10% of the total compressible liquid is carried by the lines, approximately 20% is carried by the wheel units, and approximately 70% is carried by the accumulators. Of course, these proportions can be varied to suit.

The suspension system of Figure 1 resiliently supports the vehicle on the road wheels through the wheel cylinders as a result of the combined resiliency of the compressible liquid in the cylinders themselves, in the lines and in the accumulators, and through the resilient effect of the lines themselves if they are constructed of suitable material. The vehicle can be raised or lowered at will, or a constant level can be maintained regardless of the load in the vehicle by varying the heat applied to the accumulators. If the accumulators are heated, the liquid therein will expand and raise the vehicle, and, conversely, if the accumulators are cooled the liquid will contract and lower the vehicle.

Since a polymorphic liquid is preferably utilized in the accumulators, variation of the temperature will vary the pressure at which the liquid will undergo polymorphic transition. By varying the temperature to maintain the polymorphic transition pressure substantially equal to the pressure in the accumulators, the liquid volume will be maintained substantially constant and the vehicle will be resiliently supported in the polymorphic range of the liquid for obtaining the effect of internal fluid dampening of road shock, to be discussed in detail later.

If the control valves 60 and 62 are connected to and controlled by vehicle level sensing means, the amount of exhaust heat supplied to the accumulators can be increased or decreased automatically to raise or lower the vehicle as required. If desired, the liquid in the suspension system can be connected to hydraulically actuated accessories of any type such as power steering, power brakes, power windows, power scoops, power buckets, power pile drivers, power starters, or the like, and the fluid bled off for such purposes can be compensated for by increasing the heat supplied to the accumulators, thus reducing the need for accessory pumps or other sources of power.

It is important to note that the only source of power utilized is the waste heat of the engine from the exhaust and this heat is advantageously utilized for vehicle leveling and for supplying surge or emergency accessory power.

Figure 2 illustrates an accumulator and control system which can be utilized in the vehicle suspension system of Figure 1. The schematically illustrated accumulator of this figure is designated by the reference numeral 80. The accumulator includes an insulated outer casing 82 having a container 84 supported therein. The container 84 is preferably metallic and is constructed with a plurality of fins 86 for conducting heat.

The container 84 is filled with a compressible "accumulator" liquid capable of undergoing a reversible polymorphic transition within the range of pressures and temperatures to be encountered in operation of the system. For example, the liquid might be one of the class of dimethyl siloxane liquids, commonly referred to as "silicones," or benzene.

The characteristics of one such polymorphic liquid are illustrated in Figure 7 which is a plot of pressure (in pounds per square inch) versus volume reduction (in percent). The particular liquid illustrated maintains a given "low volume" polymorphic form at 65° Fahrenheit regardless of pressure, as illustrated by the dash line marked "A" and the solid line continuation marked "B." At 75° Fahrenheit this same liquid is capable of undergoing a reversible polymorphic transition from one form to another at a constant pressure of 4,000 p.s.i., so that below this pressure the liquid assumes a "high volume" form illustrated by the solid line "C" and above this pressure assumes the low volume form as illustrated by the solid line "B." The polymorphic transition at 75° F. between the high volume form of line "C" and the low volume form of line "B" is illustrated by the connecting line "D." At 80° F. the liquid is capable of undergoing constant pressure polymorphic transition or change in form at approximately 6300 p.s.i. as illustrated by the dash line marked "E." At 90° F. the same liquid undergoes polymorphic transition at approximately 8300 p.s.i. as illustrated by the dash line marked "F," and at 110° F. the liquid undergoes polymorphic transition at approximately 9800 p.s.i. as illustrated by the dash line marked "G." Of course, at intermediate temperatures intermediate pressure-volume curves are followed. It will be understood that all the lines marked "D," "E," "F" and "G" illustrate polymorphic change under perfect isothermal conditions in which all of the necessary heat energy is instantly supplied or absorbed during polymorphic transition between the low volume form and the high volume form.

Referring back to Figure 2, the container 84 includes a flexible bulb or diaphragm 88 therein which is completely filled with a non-polymorphic compressible "wheel cylinder" liquid and is connected through a passageway 90 and through a valve 92 to wheel cylinder passages 94 and 96. For example, the passages 94 and 96 could be connected to front and rear wheel cylinders such as those illustrated in Figure 1. It will be seen that the pressure of the wheel cylinder liquid will be transmitted to the polymorphic accumulator liquid in the container 84, and vice versa, but the accumulator liquid and the wheel cylinder liquid will not be intermixed because of the presence of the diaphragm 88.

For varying the temperature of the accumulator liquid the casing 82 is connected to a source of heat, such as engine exhaust gas, by means of an inlet passage 98, and an exhaust passage 100 is provided to achieve circulation of the heated gas through the casing. The flow of exhaust gas is controlled by a valve 102 which is operated by an electric motor 104. The valve 102 is normally biased toward open position.

The motor 104 is grounded and is also connected by means of a lead 106 to a contact 108 of a level sensing device 110. The level sensing device 110 includes a movable switch arm 112 connected by means of a lead 114 through an ignition switch 116 to the vehicle battery 118. The battery is grounded as shown to complete the circuit to the motor 104 when the ignition switch is closed and the arm 112 and contact 108 are engaged.

The level sensing device may include an arm 120 connected in any suitable manner (not shown) for sensing the level of the vehicle frame relative to the wheels so that when the frame is below a certain position, the contact 108 and the arm 112 are disconnected, but when the frame moves upwardly sufficiently, contact is made completing the circuit to the motor 104. The completion of the circuit causes the motor to be energized moving the valve 102 toward its closed position to reduce the amount of heated exhaust gas passing through the casing 82 and to reduce the heat applied to the accumulator, so that the accumulator liquid volume is reduced and the vehicle is lowered until the contact is broken.

To provide for vehicle leveling at start before the exhaust gas has had an opportunity to heat the accumulator sufficiently, an electrical resistance unit 122 is provided. The resistance coil 122 is grounded and is connected by a lead 124 to a contact 126 of a time delay mechanism 128. The time delay mechanism 128 includes a movable contact arm 130 associated with a solenoid 132. The solenoid 132 is grounded and is connected by means of a lead 134 to the switch arm and to a contact 136 in the level sensing device 110. The contact 136 is below and spaced from the contact 108 in such a position that when the arm 112 is moved upwardly sufficiently it engages the contact 108 and when moved downward sufficiently it engages the contact 136.

The valve 92 may be constructed in any suitable manner to freely pass pressure surges from the accumulator to the wheel cylinders but to dampen reverse pressure surges. For example, the valve may include a pair of valve disks 138 and 140 having respective restricted central orifices 142 and 144 therethrough. The arrangement is such that pressure surges within the accumulator will cause the valve disks 138 and 140 to open to permit free passage of fluid, but sudden pressure surges from the wheel cylinders toward the accumulator, occasioned by the vehicle encountering sudden bumps, will cause the valve disks to close to cause restricted flow through the orifices. Thus, the valve 92 dampens sudden bounce but does not dampen rebound.

The system of Figure 2 will maintain a vehicle level as determined by the sensing device 110 through heat applied to the accumulator and to the polymorphic liquid therein through the vehicle exhaust system or through the electrical resistance 122. The valve 102 is spring biased toward the open position so that the full effect of exhaust gas is obtained to heat the polymorphic liquid until sufficient expansion has been obtained to raise the level of the vehicle until the level sensing device closes the circuit to the contact 108. As long as the contact 108 is closed, the valve 102 moves toward closed position until the polymorphic liquid becomes cooled sufficiently to reduce the level of the vehicle to open the contact.

When the vehicle is started, the polymorphic liquid in the accumulator is ordinarily cool enough that the contact 136 of the sensing device 110 is engaged. Initially the ignition switch 116 is turned to the starting circuit. After the vehicle engine has started from the key start and the switch has returned to its running position, a circuit is completed to the time delay solenoid 132, and after a delay period of seven seconds, the solenoid acts to move the switch arm 130 into engagement with the contact 126 to complete the circuit to the resistance element 122. This causes the polymorphic liquid to be heated very quickly resulting in a fast increase in volume to raise the vehicle level. When the level has been raised sufficiently, the sensing switch arm 112 is moved away from the contact 136 so that the resistance element is de-activated. By this time the vehicle engine is started and the heat of the exhaust gas is utilized for normal control, although if the exhaust gas supply should be cut off for some reason the electrical system will still maintain the vehicle level.

While as much as 600 watts may be required to initially raise the vehicle by means of the resistance coil 122, only a small fraction of this electrical energy is required to maintain the vehicle level after the polymorphic liquid is once warmed. If desired, the leveling can be accomplished through the electrical system alone. The system is operated in this manner if the valve 102 is held closed either purposely or through malfunctioning. As long as the circuit is not broken for longer than seven seconds, the switch 130 will remain closed and control will be achieved through making and breaking of the contact 136. Ordinary road oscillation due to bumps and the like, will not cause the holding circuit to be broken.

If the exhaust gas control system is operative, control is ordinarily achieved through the switch contact 108. After the circuit through the contact 136 has been broken for seven seconds, the solenoid 132 is de-energized and the holding circuit is broken until the next start.

If the system is utilized in connection with an air conditioned vehicle, the sensitivity of vehicle leveling control can be enhanced by providing a cold air control arrangement in the accumulator similar to that for exhaust gas control. With such a system an abnormally high vehicle level would not only reduce the flow of exhaust gas but would supply a flow of cooled air to speed the cooling of the polymorphic liquid.

Whatever means are utilized for heating or cooling the polymorphic liquid in the accumulator, the arrangement is such that the polymorphic liquid temperature will be maintained at substantially the temperature at which polymorphic transition will occur, depending upon the pressure in the system due to the vehicle weight and its load. Referring again to Figure 7, for example, the vehicle weight and load are such that the system pressure is 4000 p.s.i., for the particular polymorphic liquid illustrated the polymorphic liquid temperature will be maintained at substantially 75° F. If the sensing system senses that the vehicle level is too low, the polymorphic liquid will be heated to raise the polymorphic level so that the liquid will change or partly change to its lower pressure, higher volume form to raise the vehicle. Vice versa, if the vehicle level sensing device senses that the frame is too high, the heat supplied to the polymorphic liquid will be reduced or cut off so that the temperature will be reduced, reducing the polymorphic level so that the liquid will tend to change or partly change to its higher pressure, lower volume form to lower the vehicle. If the vehicle load is increased so that the pressure is increased, this will be sensed by the level sensing device which will raise the temperature and the polymorphic level according to the requirements of the polymorphic liquid used.

When a polymorphic liquid is utilized in the accumulator, substantial rebound dampening is accomplished within the liquid itself. Referring to Figure 7, assume the vehicle is being operated with the system at approximately 6300 pounds pressure and the vehicle encounters a sudden bump. The pressure will be suddenly increased along a line such as the line E' since a finite time is required to accomplish polymorphic transition by pressure because of transfer of energy through heat. Polymorphic liquids vary widely as to the time required for polymorphic change, from a small fraction of a second to several seconds or longer. Because of the time lag the polymorphic change does not follow the theoretical line E and a considerably higher pressure is encountered. As the effect of the bump is dissipated, the pressure level then follows a reverse curve, such as that illustrated by E'', which is below the curve E' but does not quite coincide with the theoretical isothermal curve E. The area enclosed between the curves E' and E'' represents the energy absorbed in the polymorphic liquid on rebound, and since the energy is absorbed in the liquid itself, it is not fed back into the system in the form of rebound energy. Rebound is thus dampened in the liquid itself rather than by mechanical means. The amount of rebound dampening can be varied to suit by varying the heat transfer characteristics of the accumulator 80, such as by changing the arrangement of the fins 86, or by substituting another polymorphic liquid with different characteristics of polymorphic change.

The polymorphic rebound dampening is enhanced by reason of the fact that the non-polymorphic liquid in the wheel cylinders and in the lines leading thereto is ordinarily somewhat cooler than the liquid in the accumulator, so that when sudden bounce occurs, a slug of the cooler liquid is suddenly introduced into the flexible diaphragm or bulb in the accumulator to assist in cooling the accumulator liquid. This results in absorption of some of the heat causing polymorphic transition from the high volume form to the low volume form, and this additional absorption of energy further dampens rebound.

The polymorphic dampening varies according to temperature differential. In all conventional shock absorber systems, shock absorption is greater during winter because of increased viscosity resulting in increased viscous dampening, and in the summer shock absorption is less because of decreased viscosity. The suspension system of this invention has the ability to compensate somewhat for this effect. In the winter when viscous dampening is greater, the colder liquid from the lines absorbs more energy, thus increasing the energy absorbed in the polymorphic liquid on rebound and consequently increasing the polymorphic dampening. By the same token, in the summer when viscous dampening is less, slugs of liquid introduced into the accumulator during bounce are not as cold and consequently absorb less energy, so that less energy is absorbed in the polymorphic liquid on rebound making the spring rate stiffer. Thus, the system tends to provide a stable, evenly dampened ride, summer or winter.

An additional advantage of the system of this invention, particularly in connection with heavy vehicles, is the provision of increased polymorphic dampening with increased vehicle load. When the vehicle load is increased, higher operating temperatures are provided in the accumulator to increase the pressure level of polymorphic transition to compensate for the added pressure in the system due to the added load. For a given ambient temperature the ability of a cold slug of liquid from the lines to subtract energy from the hotter accumulator liquid does not materially increase. Thus, the cold slug subtracts less of the total energy of polymorphic transition, so that less energy is absorbed in the polymorphic liquid on rebound. As a result, at heavily loaded conditions the spring rate is increased at a time when increased spring rate is desirable.

Another embodiment of accumulator and control system is illustrated in Figure 3. In this embodiment an accumulator 150 is illustrated and includes an outer insulated casing 152 and an inner liquid container 154. The container 154 is filled with a polymorphic liquid and an electric resistance coil 156 is disposed in the liquid for heating the liquid when desired. A flexible diaphragm or bulb 158 is disposed in the container 154 and the bulb is completely filled with a non-polymorphic compressible liquid and is connected to the front and rear wheel cylinders of one side of a suspension system such as illustrated in Figure 1. The casing 152 is provided with an inlet passage 160 and an outlet passage 162. Thus far the construction and arrangement is quite similar to that illustrated and described in connection with Figure 2.

For controlling the temperature of the polymorphic liquid contained in the container 154 a valve 164 is connected to the inlet passage 160 and controls flow from a passage 166 and another passage 168. The passage 166 is connected to a source of heated fluid, such as hot water coming from the engine in the engine cooling system, and the passage 168 is connected to a source of relatively cool fluid, such as the relatively cool water coming from the radiator of the engine cooling system. The outlet 162 is connected back to the vehicle cooling system so that a closed circuit is provided. An internal control member 170 of the valve 164 is connected to an arm 172 which is, in turn, connected to a vehicle level sensing arm 174 which senses the height of the vehicle frame relative to the wheels.

When the accumulator control system of Figure 3 is utilized in a suspension system, the vehicle level determines the position of the rotatable valve member 170. If the vehicle frame is too low, the valve member is rotated in a counter-clockwise direction to increase the flow of hot water from the passage 166 and to decrease the flow of relatively cool water from the passage 168. This causes the polymorphic liquid in the container 154 to be heated and the resultant expansion raises the level of the vehicle. Conversely, if the vehicle level is too high, the valve member 170 is rotated in a clockwise direction to reduce flow of hot water and to increase flow of relatively cool water to reduce the temperature of the polymorphic liquid and to lower the vehicle level. It is contemplated that any suitable type of dampening means (not shown) can be utilized in connecting the level sensing arm 174 to the vehicle in order that the arm be relatively unaffected by ordinary road oscillations of the wheels relative to the frame, so that only the average level of the frame is sensed and transmitted to the control valve 164. When the vehicle engine and cooling system are cold at start, the vehicle leveling may be accomplished through the electrical resistance coil 156 which may be connected and controlled in the manner shown in Figure 2.

A third embodiment of accumulator and control system is illustrated in Figure 4. In this embodiment an accumulator 180 includes an outer insulated casing 182 which encloses a finned container 184 containing a compressible polymorphic liquid. A flexible diaphragm or bulb 186 is included within the container 184 and is completely filled with a compressible non-polymorphic liquid and connected to the wheel cylinders of one side of a suspension system by means of conduits 188 and 190. The casing 182 is provided with an inlet 192 and an outlet 194. For providing initial vehicle leveling at start, an electrical resistance coil 196 is connected through a level sensing switch 198 and an ignition switch 200 to the vehicle battery 202. The resistance coil arrangement and operation is substantially the same as shown in connection with Figure 2 except that no time delay device is provided although, if desired, this feature can be included in exactly the same manner.

For controlling the temperature of the polymorphic liquid in the accumulator shown in Figure 4, a control valve 204 is connected to the inlet 192 and controls flow from a cold air duct 206 and a warm air duct 208 through respective valve control members 210 and 212. The cold air duct 206 is connected to the atmosphere and flow may be obtained through ram when the vehicle is moving or by means of a blower (not shown) or both. The warm air duct is connected to the warm air outlet of the vehicle hot water heater 214 which may be of any suitable construction, such as that shown including a hot water heat exchanger 216 through which heated water from the vehicle cooling system is circulated, so that the air drawn across the heat exchanger 216 is heated and directed to the warm air duct 208. The valve control members 210 and 212 are operably connected to a control lever 218, which, in turn, is connected to and adapted for being rocked by an electric actuating motor 220. The motor 220 is reversible and its respective reversing contacts are connected to the upper and lower contacts in the level sensing device 198.

The device of Figure 4 operates in much the same manner as that of Figure 2 with initial leveling being performed by the resistance coil 196 and leveling thereafter being performed through the control valve 204 in conjunction with the coil 196. The arrangement is such that when the vehicle level is too low, the coil 196 is energized and at the same time the warm air duct 208 is opened, while the cool air duct 206 is closed, to heat the polymorphic liquid in the accumulator by warm air from the vehicle heater in conjunction with the heating coil and to raise the vehicle level. When the vehicle level gets too high, the reversible motor 220 closes the warm air duct 208, cuts out the coil 196, and opens the cool air duct 206 to cool the polymorphic liquid and consequently to lower the vehicle.

A preferred embodiment of accumulator for use in the schematically illustrated systems of Figures 1-4 is shown in detail in Figure 5. The accumulator in this figure is generally designated by the reference numeral 230 and includes an outer insulated casing 232 and an inner container 234 disposed in spaced relation in the casing. The container 234 is provided with a plurality of fins 236 for enhancing heat transfer and is filled with a polymorphic compressible liquid 238. A flexible diaphragm or bulb 240 extends into the container 234 in spaced relation therein and is filled with a non-polymorphic compressible liquid. The bulb 240 is connected by means of a pair of conduits 242 and 244 to the front and rear wheel cylinders of one side of a suspension system such as shown in Figure 1. The flow between the wheel cylinders and the bulb 240 is controlled by a dampening valve 246. An electrical resistance heating coil 248 is immersed in the polymorphic liquid 238 and surrounds the bulb 240. The coil is connected to the vehicle battery (not shown) through electrical circuit means 250. The outer casing 232 is provided with an inlet port 252 and an outlet port 254, the inlet port being connected to a source of heated fluid, such as the vehicle exhaust system, the vehicle cooling system, or the vehicle heater, in the manner shown and described in connection with Figures 2-4.

The dampening valve 246 includes a valve disk 256 having a central restricted orifice 258 therethrough. The disk rests on a plurality of fingers 260 which provide for free fluid communication between a passage 262 leading directly into the bulb 240 and a chamber 264 containing the valve disk 256. The arrangement is such that sudden surges of pressure from the wheel cylinders are unimpeded, but pressure surges from the bulb toward the wheel cylinders are dampened by reason of the valve disk 256 moving upwardly against a valve seat 266 whereby the liquid must pass through the restricted orifice 258 in order to move from the bulb toward the wheel cylinders. Thus the arrangement is such that sudden bounce is not dampened while rebound is dampened, just the reverse of the arrangement shown and described in connection with the dampening valve 92 of Figure 2.

In order to prevent the vehicle level from becoming too low when the vehicle is standing idle at low ambient temperature, a valve 268 is provided at the juncture between the conduits 242 and 244 and the passage leading into the bulb 240. The valve 268 is adapted to engage in a valve seat 270 under the influence of a spring (not shown) whenever the vehicle engine is stopped in order to trap the liquid in the wheel cylinders. This substantially reduces the volume of liquid supporting the vehicle and divorces the wheel cylinders from the substantial contraction of the polymorphic liquid in the accumulator when the vehicle is standing idle. Thus, while the liquid in the wheel cylinders does contract somewhat while the vehicle is standing idle at low temperatures, the reduction in volume is relatively small and the vehicle is not lowered drastically. If the valve 268 were not provided, the effect of the added volume in the bulb 240 together with the effect of contraction of the polymorphic liquid 238 would allow the vehicle to be down on its tires when standing idle.

The valve 268 is controlled by a time delay solenoid 272 which is electrically connected to the vehicle ignition system (not shown) so that when the vehicle ignition switch is on, the solenoid 272 is energized to disengage the valve 268 from the seat 270. The solenoid 272 is constructed in any suitable manner to provide a time delay of several seconds before the valve 268 is opened after the ignition switch is turned on, in order that the polymorphic liquid 238 in the accumulator may be sufficiently heated before the valve is opened to prevent the vehicle from dropping down due to the initial low volume in the accumulator.

In connection with the construction of Figure 5, the combination of viscous rebound dampening through the valve 246 and polymorphic springing through the polymorphic liquid 238 provides an advantageous effect. As the ambient temperature increases, the stiffening effect of polymorphic springing also increases due to less rapid polymorphic change at elevated temperatures. At the same time when the temperature is elevated the wheel cylinder liquid becomes thinner and the effect of viscous dampening through the orifice 258 is reduced. Thus, the effect of one change substantially balances the effect of the other.

It should here be noted that while the accumulators have been described as utilizing polymorphic liquids, they can be used with non-polymorphic compressible liquids. In this event the liquid capacity must be increased in order to achieve the required volume changes by ordinary contraction and expansion.

A typical wheel cylinder construction is illustrated in detail in Figure 6, showing a wheel cylinder generally designated by the reference numeral 280 which includes a casing 282 and a piston 284. The wheel cylinder 280 is not unlike present day shock absorbers except that it is completely filled with a compressible liquid without an expansion chamber. The piston 284 includes a piston rod 286 and a dampening head 288 having viscous dampening passages 290 therethrough. A suitable liquid spring seal 292 is provided at the region of entry of the piston rod into the casing. A passage 294 leads into the casing and is connected by suitable conduit means such as shown in Figure 1 to one of the conduits 242 or 244 of the accumulator 230 of Figure 5. It will be understood that the casing and the piston are connected to the respective sprung and unsprung portions of the vehicle in order to resiliently support the vehicle on the wheels.

The piston 284 of the wheel cylinder 280 is shown in its compressed position due to insertion of the piston rod 286 into the casing to displace and compress the compressible liquid therein. The pressure is transmitted through the lines to the bulb 240 of the accumulator so that polymorphic transition occurs, or partially occurs, in the polymorphic liquid 238, as represented by the $x$'s shown therein. It is the effect of this polymorphic transition which subtracts energy to provide polymorphic rebound dampening as indicated by the curves E' and E'' of Figure 7. Thus, much of the energy put into the system by compression of the piston 284 will not be sent back to the piston in the form of rebound energy, since a substantial portion of this pressure energy has been converted to heat energy and dissipated in the accumulator as previouly described.

Figure 8:
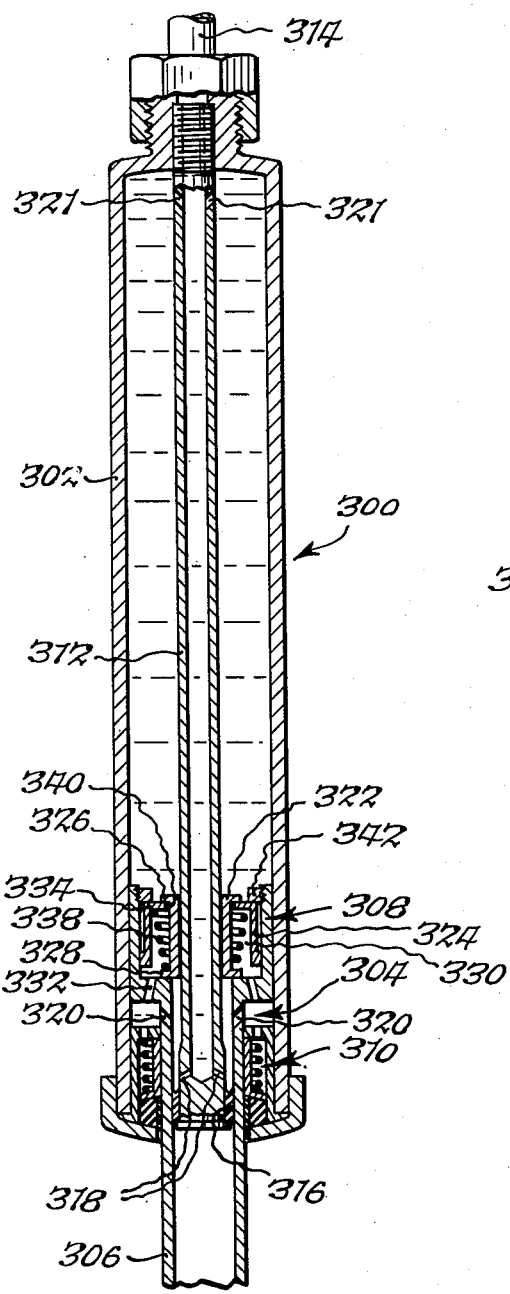
Figure 8 is an enlarged sectional view of a second embodiment of wheel strut or cylinder for use in a suspension system of the present invention.

Figure 8 illustrates another embodiment of wheel cylinder generally designated by the reference numeral 300. This wheel cylinder includes a casing 302 completely filled with a compressible liquid and a piston 304 inserted therein. The piston 304 is tubular as shown in order to reduce the effective piston area and to provide for a lower spring rate so that the construction can be utlizied in a lighter vehicle without necessitating the use of levering to obtain the desirable long stroke action. The piston 304 includes a hollow shank 306 and an enlarged diameter dampening head construction 308. A suitable liquid spring seal arrangement 310 is provided about the shank 306 at the region of entry into the casing 302. An elongated hollow center stem 312 is fixedly connected at the upper end of the casing as shown and the hollow center of the stem 312 communicates with a conduit 314 which leads to the accumulator. A suitable liquid spring seal 316 is provided at the lower end of the stem 312. The diameters of the seals 310 and 316 are kept to a minimum to reduce friction as much as possible since the wheel cylinder 300 is intended for use in light passenger vehicles where friction is critical.

Passages 318 are formed through the steam 312 to provide communication between the interior of the stem and the interior of the shank 306 of the piston 304. Communication between the interior of the shank 306 and the interior of the casing 302 below the dampening head 308 is provided by means of passages 320 formed through the wall of the shank adjacent the dampening head and passages 321 on the upper wall of the shank.

The dampening head 308 includes an internal valve member 322 and an external valve member 324. The internal valve member is slidably disposed about the stem 312 and is provided with an upper annular lip 326 retaining the outer valve member 324 and a lower and a lower annular lip 328 normally closing communication between the interior of the piston shank 306 and a chamber 330 provided in the piston head. The chamber 330 communicates with the casing 302 below the piston head through a plurality of passages 332. The external valve member 324 is provided with an inturned annular lip or flange 334 which is normally resiliently held in engagement with the flange 326 of the internal valve member by means of a coil compression spring 338 to normally prevent communication between the piston head chamber 330 and the portion of the casing 302 above the piston head. An annular clearance 340 is provided between the flange 334 and the central portion of the internal valve member 322 to permit communication between the chamber 330 and the upper portion of the casing 302 when the flanges 326 and 334 are separated.

In the construction of Figure 8 both bounce and rebound are dampened. On bounce the pressure above the piston head causes the external valve member 324 to move downwardly to permit liquid to pass through the clearance 340 and the passages 332 to the portion of the casing below the piston head. At the same time liquid passes from this region through the passages 320, and from the region above the piston head through the passages 321 and 318, to the interior of the piston shank 306. On rebound, the external valve member 324 is prevented from upward movement by means of an annular keeper ring member 342, and the pressure which builds up in the shank 306 below the internal valve member 322 and in the piston head chamber 330 moves the internal valve member upwardly against the compression of the spring to permit passage of fluid through the passages 332 and between the flange 338 and its seat into the piston head chamber 330 and then through the clearance 340 into the casing 302 above the piston head. At the same time liquid passes through the passages 318 and 321 to the region above the piston head. The amount of relative dampening on bounce and on rebound can be varied by varying the effective areas of the passages and clearances.

Figure 9:
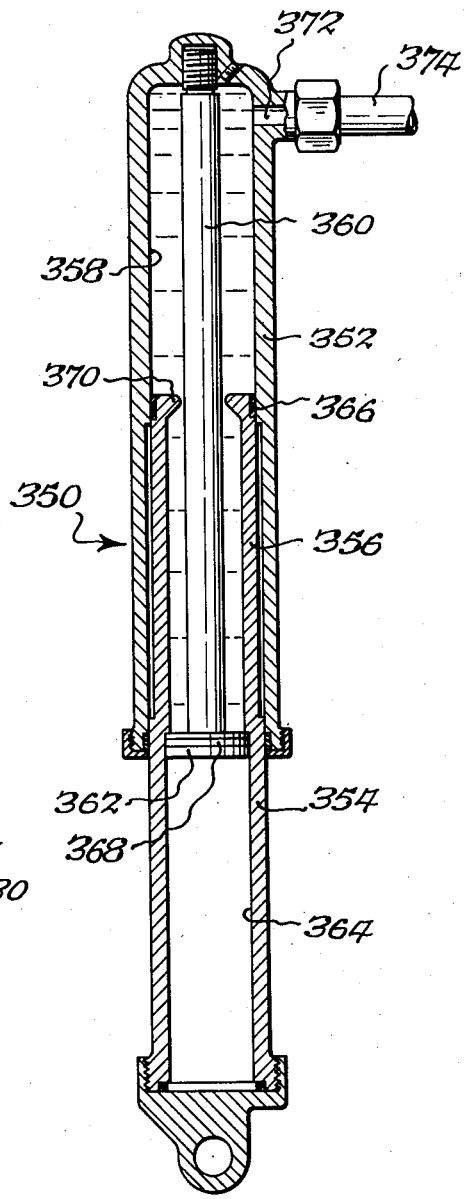
Figure 9 is an enlarged sectional view of a third embodiment of the wheel strut or wheel cylinder, particularly adapted for use in connection with heavy vehicles.

A third embodiment of wheel cylinder is illustrated in Figure 9. The wheel cylinder of this figure is generally designated by the reference numeral 350 and is of heavy duty construction intended for use in a heavy vehicle such as a truck or an off-the-road vehicle. This cylinder includes a heavy walled casing 352 and a heavy walled tubular piston 354. The piston and the casing are of the stepped variety such as shown in my earlier filed copending application Serial No. 481,658, filed January 13, 1955, now Patent No. 2,909,368, dated October 20, 1959. The piston is provided with a reduced diameter head portion 356 which fits in a reduced diameter chamber 358 of the casing. A central stem member 360 is fixedly secured at the upper end of the casing and has at its lower end a piston head 362 which is disposed for reciprocation in an increased diameter chamber 364 formed within the tubular piston. A suitable male liquid spring seal 366 is provided at the upper end of the piston 354 and slidably engages the wall of the reduced diameter chamber 358 of the casing, and a suitable male liquid spring seal 368 is provided on the piston head 362 and engages the enlarged diameter chamber 364 formed within the piston. The seal friction of this embodiment is not particularly critical so that larger diameter separated male seals can be utilized.

The tubular piston 354 is provided at its upper end with an annular inturned flange 370 forming an annular reduced area passage between the flange and the adjacent stem 360 to provide for viscous dampening on bounce and rebound. The upper portion of the casing 352 is adapted to communicate with a suitable accumulator (not shown) by means of a passage 372 connected to a conduit 374. As explained in my copending application Serial No. 481,658 above referred to, the stepped tubular construction allows provision of any desired spring rate while still allowing use of heavy walled parts for strength purposes.

Figure 10:
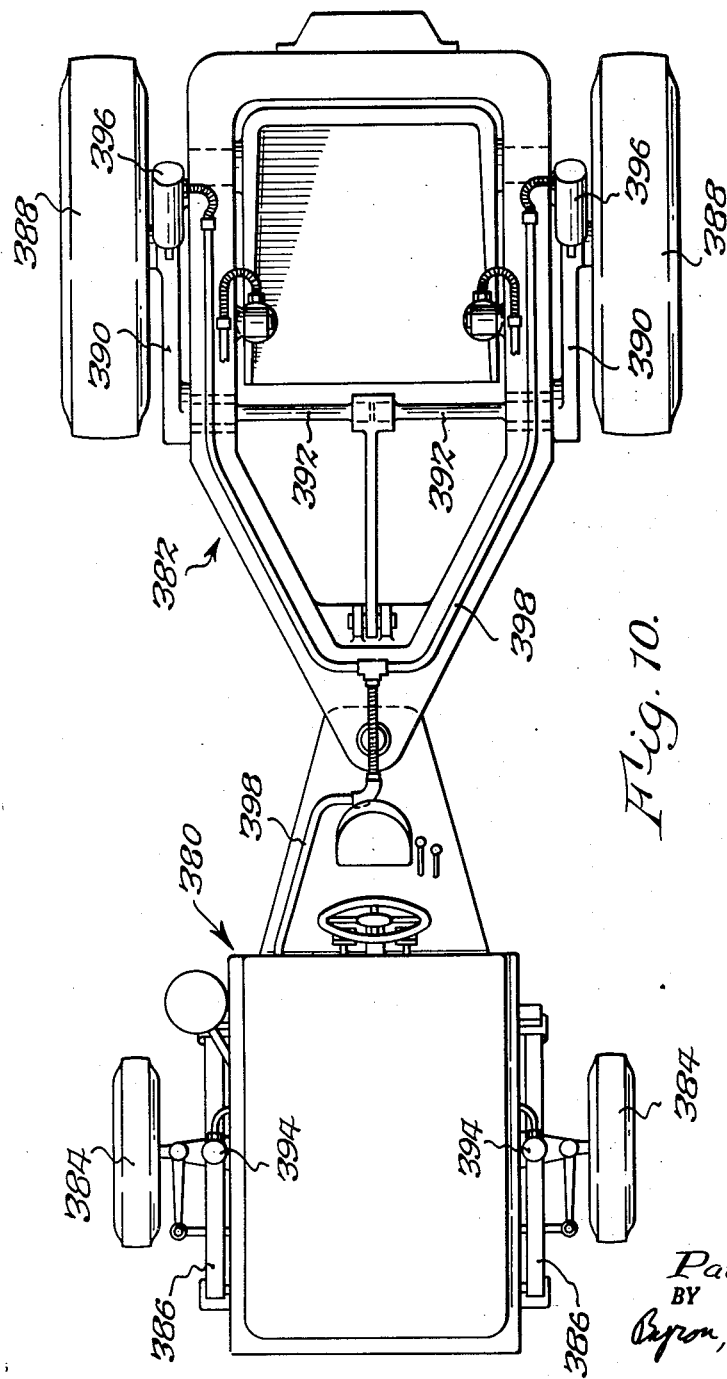
Figure 10 is a schematic plan view of another embodiment of vehicle suspension system according to the present invention, particularly adaptable for use in connection with heavy off-the-road vehicles.

Figure 10 illustrates a modified form of suspension arrangement in which a liquid spring suspension is utilized as an auxiliary system in connection with a regular mechanical spring suspension. The suspension system of this embodiment is preferably utilized in connection with a heavy off-the-road vehicle such as a bulldozer or scraper, but the system could be utilized with lighter vehicles such as passenger cars. The particular form shown is applied to a heavy carry-all vehicle including an engine driven tractor 380 connected for pulling a trailer 382. The tractor body is rotatably mounted on steerable wheels 384, 384 by means of conventional leaf springs 386, and the trailer body is mounted for rotation on a pair of heavy duty wheels 388, 388 through trailing links 390, 390 which are fixedly secured at the outer ends of torsion bar springs 392, 392.

For providing vehicle leveling, auxiliary support, and shock absorption the suspension arrangement of this modified construction utilizes a liquid spring suspension system quite similar to that illustrated in connection with Figure 1. The auxiliary liquid spring suspension system includes a pair of front wheel cylinders 394, 394 which are disposed between the sprung and unsprung portions of the tractor 380 to provide additional resilient support and shock absorption for the body of the tractor. A pair of rear wheel cylinders 396, 396 are operatively disposed between the sprung and unsprung portions of the trailer 382 to provide additional resilient support for the trailer. The front wheel cylinders 394 and the rear wheel cylinders 396 are all interconnected by means of a conduit system 398 to a single accumulator (not shown). The wheel cylinders and the accumulator are preferably of substantially the same construction as those previously described in detail in connection with the previous figures. The wheel cylinders and lines are completely filled with a non-polymorphic compressible liquid while the accumulator is preferably filled with a polymorphic compressible liquid. In this embodiment of the invention it is not necessary that separate systems be provided for the two sides of the vehicle inasmuch as the primary resilient support is through the leaf springs 386 and through the torsion springs 392.

When the vehicle of Figure 10 is operated empty or with a light load, the tractor and trailer bodies are normally supported on the mechanical springs, and the liquid springs act as shock absorbers with the liquid spring suspension system acting as a vehicle leveling device to maintain the tractor and the trailer at a predetermined level in exactly the same manner as described in connection with the earlier embodiments. When the trailer is heavily or fully loaded, the wheel cylinders act in conjunction with the mechanical springs to provide added resilient support while continuing to act for shock absorption and vehicle leveling. The auxiliary system also provides a safety factor in the event of failure of the mechanical suspension system, and if need be the liquid spring suspension system can support the entire weight of the vehicle so that break-down of one of the systems will not result in failure of the vehicle.

It will be readily apparent from the foregoing description that the present invention provides a very much improved vehicle suspension system which also efficiently operates as a vehicle leveling system by utilizing waste heat of the engine, or other heating means. With this system it is not necessary to provide auxiliary pumps, or the like (which increase bulk and waste horse power) to provide vehicle leveling. The suspension system of this invention can be utilized to replace present springs and shock absorbers or can be used in connection with an existing spring system. The system is very simple and compact, is inexpensive to build and maintain, and provides greatly improved riding qualities while at the same time providing improved vehicle leveling.

Variations and modifications may be effected without departing from the scope of the novel concepts of the present invention.

I claim:
1. A suspension system for a vehicle having a body and a plurality of supporting wheels, comprising a compressible liquid spring operatively disposed between each of said wheels and said body for resiliently supporting the body, separate compressible liquid accumulator means, and conduit means hydraulically interconnecting said accumulator means with at least some of said liquid springs.

2. A suspension system for a vehicle having a body and a set of supporting wheels on each side thereof, comprising a compressible liquid spring operatively disposed between each of said wheels and said body for resiliently supporting the body, a first separate compressible liquid accumulator, conduit means hydraulically interconnecting said first accumulator with the liquid springs of one of said sets of supporting wheels, a second separate compressible liquid accumulator, and conduit means hydraulically interconnecting said second accumulator with the liquid springs of the other of said sets of supporting wheels.

3. A suspension system for an internal combustion engine driven vehicle having a body and a plurality of supporting wheels, comprising compressible liquid means operatively associated with said body and said wheels for resiliently supporting the body, and means utilizing waste heat from said vehicle engine and operatively associated with said compressible liquid means for varying the temperature of a portion of said compressible liquid means to vary the level of said body relative to said wheels.

4. A suspension system for a vehicle having a body and a plurality of supporting wheels, comprising a compressible liquid spring operatively disposed between each of said wheels and said body for resiliently supporting the body, separate compressible liquid accumulator means, and conduit means hydraulically interconnecting said accumulator means with at least some of said liquid springs, and means operatively associated with said accumulator means for varying the temperature of the compressible liquid in said accumulator means to vary the level of said vehicles body relative to said wheels.

5. A suspension system according to claim 4 wherein said temperature changing means include a source of heated fluid and valve mechanism for controlling introduction of said heated fluid to said accumulator means.

6. A suspension system according to claim 4 including level sensing control means sensing the level of said body relative to said wheels and operatively associated with said temperature varying means for controlling the temperature of the compressible liquid in said accumulator means to maintain a predetermined average level of said body relative to said wheels.

7. A suspension system according to claim 4 wherein said compressible liquid accumulator means contain a compressible liquid capable of undergoing reversible polymorphic change in the range of temperatures and pressures encountered during operation of the suspension system, whereby variation of the temperature of said compressible liquid by said temperature varying means raises the polymorphic change level in said liquid to change the volume of the liquid and to thereby change the level of said body relative to said supporting wheels.

8. A suspension system according to claim 4 wherein said vehicle includes an internal combustion driving engine and wherein said temperature varying means include apparatus for controlling introduction of heated exhaust gas from said engine to said accumulator means.

9. A suspension system according to claim 4 wherein said vehicle includes an electrical system and wherein said temperature varying means include electrical apparatus connected to said electrical system and operatively associated with said accumulator means for selectively heating the compressible liquid in said accumulator means.

10. A suspension system according to claim 4 wherein said vehicle includes a heater system for heating a fluid and wherein said temperature varying means include mechanism for controlling introduction of said heated fluid to said accumulator means for heating the compressible liquid in said accumulator means.

11. A suspension system for a vehicle having a body and a plurality of supporting wheels, comprising a compressible liquid spring operatively disposed between each of said wheels and said body for resiliently supporting the body, separate compressible liquid accumulator means, and conduit means hydraulically interconnecting said accumulator means with at least some of said liquid springs, said accumulator means containing a compressible liquid subjected to pressure of the compressible liquid in the liquid springs and adapted for polymorphic change in the range of the pressures encountered during operation of said suspension system, whereby pressure surges from said liquid springs cause polymorphic change in the compressible liquid in said accumulator means to dampen rebound pressure surges from said accumulator means to said liquid springs.

12. A suspension system for a vehicle having a body and a plurality of supporting wheels, comprising a compressible liquid spring operatively disposed between each of said wheels and said body for resiliently supporting the body, separate compressible liquid accumulator means, and conduits formed of resilient material hydraulically connecting said liquid springs and said accumulator means, whereby variation of the pressure of the liquid in said conduits flexes the conduits elastically to provide additional resilient support for the body.

13. A suspension system for a vehicle having a body and a plurality of supporting wheels, comprising a compressible liquid spring operatively disposed between each of said wheels and said body for resiliently supporting the body, separate compressible liquid accumulator means, conduit means hydraulically interconnecting said accumulator means with at least some of said liquid springs, and mechanical springs operatively disposed between said body and some of said supporting wheels to urge said body to an initial resiliently supported position relative to said wheels.

14. A suspension system for a vehicle having a body and a plurality of supporting wheels, comprising a compressible liquid spring operatively disposed between each of said wheels and said body for resiliently supporting the body, separate compressible liquid accumulator means, conduit means hydraulically interconnecting said accumulator means with at least some of said liquid springs, and a mechanical spring operatively disposed between each of said wheels and said body for normally resiliently supporting the body, whereby said liquid springs provide supplemental support for the body.

15. A suspension system for a vehicle having a body and a plurality of supporting wheels, comprising a compressible liquid spring operatively disposed between each of said wheels and said body for resiliently supporting the body, separate compressible liquid accumulator means, conduit means hydraulically interconnecting said accumulator means with at least some of said liquid springs, and viscous liquid flow restricting means operatively associated with said liquid springs for dampening flow of the compressible liquid in at least one direction to dampen shock loads between said body and said wheels.

16. A suspension system for a vehicle having a body and a plurality of supporting wheels, comprising a compressible liquid spring operatively disposed between each of said wheels and said body for resiliently supporting the body, separate compressible liquid accumulator means, conduit means hydraulically interconnecting said accumulator means with at least some of said liquid springs, viscous liquid flow restricting means operatively associated with said liquid springs for dampening flow of the compressible liquid in at least one direction to dampen shock loads between said body and said wheels, and said accumulator means containing a compressible liquid capable of undergoing reversible polymorphic change in the range of pressures encountered during operation of the suspension system whereby pressure surges from said liquid springs to said accumuator means cause polymorphic change in said compressible liquid to dampen rebound pressure surges from said accumulator means to said liquid springs.

17. In a vehicle having a body and a plurality of supporting wheels, means for varying the normal level of said body relative to said wheels including accumulator means containing a compressible liquid, and means for controlling the temperature of the compressible liquid in said accumulator means for varying the volume of the liquid to vary the level of said body.

18. A combination according to claim 17 wherein said compressible liquid is capable of undergoing polymorphic change in the range of compressible liquid pressures and temperatures encountered during operation of said vehicle, whereby variation of the temperature of said liquid by said temperature control means causes polymorphic change in said liquid to change the volume of the liquid.

19. In a suspension system for a vehicle having a body and a plurality of supporting wheels with a compressible liquid spring operatively disposed between each of said wheels and said body for resiliently supporting the body, separate compressible liquid accumulator and control apparatus for said suspension system comprising a casing, a container disposed in spaced relation in said casing, movable separating means in said container providing two separate chambers therein, means hydraulically connecting at least two of said liquid springs with one of said chambers, a first compressible liquid filling said liquid springs and said one chamber, a second compressible liquid filling the other of said chambers, and means for varying the temperature of said second compressible liquid to change the volume and pressure of said second compressible liquid whereby said one compressible liquid acts with said movable separating means to cause corresponding changes in volume and pressure of said first compressible liquid.

20. Accumulator and control apparatus according to claim 19 wherein said temperature varying means include a selectively energizable electric heating element operatively associated with said second compressible liquid.

21. In accumulator and control apparatus according to claim 19 wherein said vehicle includes an internal combustion driving engine having an exhaust system and wherein said temperature varying means include means for introducing heated exhaust gas into said casing for heating said container, and valve means for controlling the amount of exhaust gas introduced into said casing to control the temperature of the compressible liquid in said container.

22. Accumulator and control apparatus according to claim 19 wherein said vehicle includes a warm air heater and wherein said temperature varying means includes valve mechanism for providing variable flow of warm air from said heater and of ambient air to said accumulator.

23. Accumulator and control apparatus according to claim 19 including a valve controlling communication between said liquid springs and said one chamber, and means for closing said valve when said temperature varying means are inoperative and for opening said valve when said temperature varying means are operative.

24. In a suspension system for a vehicle having an internal combustion engine with an exhaust system and having an electrical ignition system, compressible liquid accumulator and control apparatus for said vehicle suspension system comprising a casing having an inlet and an outlet, a container disposed in spaced relation in said casing and containing a compressible liquid, an electrical heating element connected to said ignition system and disposed for heating said compressible liquid when energized, normally open valve mechanism controlling flow of exhaust gas into said casing, level sensing mechanism for sensing the level of said body relative to said wheels and including a first control element operatively associated with said valve mechanism for closing said valve mechanism when said body exceeds a predetermined level relative to said wheels and a second control element operatively associated with said heating element for energizing said heating element when the level of said body goes below said predetermined level, and time delay means connected between said second control element and said heating element to provide a predetermined time delay before energization of said heating element when said second control element is engaged.

25. In a suspension system for a vehicle having a body and a plurality of supporting wheels, and including an internal combustion driving engine, compressible liquid accumulator and control apparatus for said suspension system comprising a casing having an inlet and an outlet, a container disposed in spaced relation in said casing and containing a compressible liquid, level sensing mechanism for sensing the level of said body relative to said wheels, a source of electrical energy, an electrical heating element disposed for heating said compressible liquid when energized, means operatively associated with said level sensing mechanism for operatively connecting said electrical energy source and said heating element when the level of said body goes below a predetermined level relative to said wheels, valve mechanism operatively connected to said level sensing mechanism and adapted for controlling flow into the inlet of said casing, a source of fluid heated by waste heat from said engine, a source of relatively cool fluid, and means for separately directing said heated fluid and said relatively cool fluid to said valve mechanism whereby said valve mechanism mixes said fluids to provide a fluid mixture of a temperature determined by said level sensing mechanism.

References Cited in the file of this patent

UNITED STATES PATENTS

| | | |
|---|---|---|
| 2,618,478 | Conway | Nov. 18, 1952 |
| 2,660,030 | Santos | Nov. 24, 1953 |
| 2,687,311 | Nallinger | Aug. 24, 1954 |
| 2,707,110 | Stover | Apr. 26, 1955 |
| 2,716,451 | Taylor | Aug. 30, 1955 |
| 2,755,619 | Sheft | July 24, 1956 |
| 2,787,475 | Jackson | Apr. 2, 1957 |

FOREIGN PATENTS

| | | |
|---|---|---|
| 433,222 | France | Oct. 21, 1911 |
| 428,664 | Great Britain | May 16, 1935 |
| 545,003 | Italy | June 22, 1956 |

UNITED STATES PATENT OFFICE

CERTIFICATE OF CORRECTION

Patent No. 2,949,315                  August 16, 1960

Paul H. Taylor

It is hereby certified that error appears in the printed specification of the above numbered patent requiring correction and that the said Letters Patent should read as corrected below.

Column 7, line 14, after "Figure 7," insert -- if, --.

Signed and sealed this 11th day of April 1961.

(SEAL)
Attest:
ERNEST W. SWIDER
Attesting Officer

ARTHUR W. CROCKER
Acting Commissioner of Patents